United States Patent [19]

Antos

[11] Patent Number: 4,908,885
[45] Date of Patent: Mar. 20, 1990

[54] SEAL FOR SELF CONTAINED SANITARY SYSTEMS

[75] Inventor: John M. Antos, Ann Arbor, Mich.

[73] Assignee: Thetford Corporation, Ann Arbor, Mich.

[21] Appl. No.: 266,260

[22] Filed: Nov. 1, 1988

Related U.S. Application Data

[63] Continuation of Ser. No. 1,352, Jan. 8, 1987, abandoned, which is a continuation-in-part of Ser. No. 870,800, Jun. 5, 1986, Pat. No. 4,776,631.

[51] Int. Cl.$^4$ .............................................. E03D 5/00
[52] U.S. Cl. ...................................... 4/321; 277/152; 277/206 R
[58] Field of Search ................................... 4/321-323, 4/434, 438; 277/152, 153, 205, 206

[56] References Cited

U.S. PATENT DOCUMENTS

| | | | |
|---|---|---|---|
| 2,868,574 | 1/1959 | Rich | 277/152 X |
| 3,570,018 | 3/1971 | Sargent et al. | 4/323 |
| 3,949,430 | 4/1976 | Miller et al. | 4/321 |
| 4,371,177 | 2/1983 | Bahr et al. | 277/152 |
| 4,508,020 | 4/1985 | Szcupak | 277/153 X |
| 4,573,515 | 2/1986 | Grazioli | 277/206 R |

*Primary Examiner*—Charles E. Phillips
*Attorney, Agent, or Firm*—Harness, Dickey & Pierce

[57] ABSTRACT

An improved seal element for use with a self contained recreational vehicle sanitary system. This invention is particularly adapted for use with the type of sanitary system having a bench structure which defines an interior storage compartment and a waste holding tank removably disposed in the storage compartment. Waste products are transferred from the bench structure to the waste holding tank via a fill opening. A seal element is disposed around the perimeter of the fill opening which seals against both the bench structure and a movable blade valve mounted within the holding tank which closes off the fill opening when it is desired to remove the holding tank for dumping etc. The seal element includes one or more sealing lips which engage the valve blade member in its closed position. One of the seal lips is disposed in a generally radially outwardly projecting direction with respect to the fill opening when the valve is closed. This seal lip is self actuating since it more tightly seals against the valve blade in response to internal hydroplastic pressure thus providing superior protection against leakage of the contents of the waste holding tank.

2 Claims, 4 Drawing Sheets

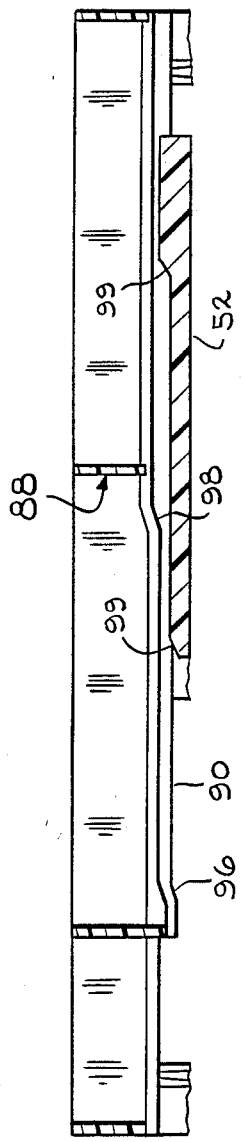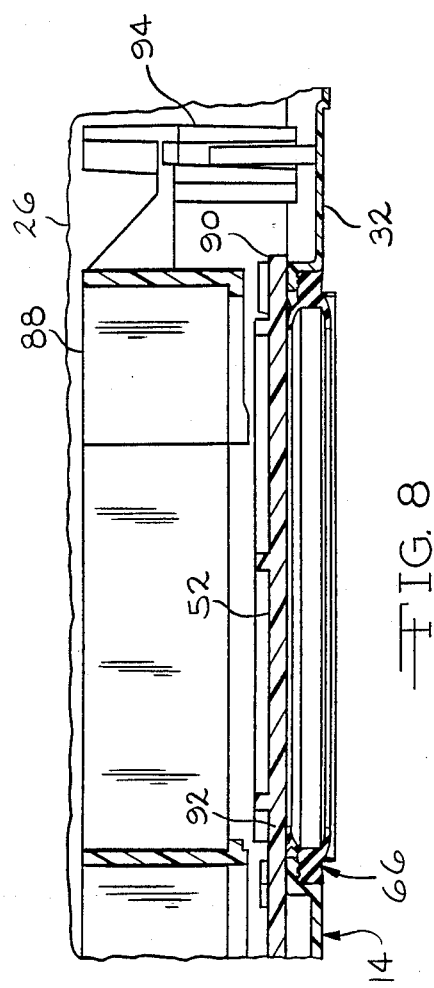

SEAL FOR SELF CONTAINED SANITARY SYSTEMS

CROSS REFERENCE TO RELATED APPLICATION

This is a continuation of application Ser. No. 001,352, filed Jan. 8, 1987.

This application is a continuation-in-part of U.S. patent application Ser. No. 870,800, filed June 5, 1986, now U.S. Pat. No. 4,776,631, issued Oct. 11, 1988, and entitled "IMPROVEMENTS IN SELF CONTAINED RV SANITARY SYSTEMS" which is assigned to the assignee of the present application and which is hereby incorporated by reference.

BACKGROUND AND SUMMARY OF THE INVENTION

This invention relates to a sealing element, and particularly to an improved seal positioned at the fill opening of a removable holding tank of a cassette type sanitary system such as described in the above referenced related application.

The above referenced patent application discloses a cassette type sanitary system particularly adapted to be mounted within the interior compartment of a recreational vehicle (RV). Wastes generated during use of the sanitary system are contained within a holding tank which can be conveniently removed from the RV through an exterior access door where it can be transported to a disposal site and emptied.

As described in detail in the above referenced related application, the waste holding tank has a centrally disposed fill opening within its top wall portion which enables the holding tank to accept waste products from an associated appliance such as a toilet. A seal element surrounds the fill opening and has an upper surface which seals against an associated structure of the sanitary system so that when wastes are transported into the holding tank they will not leak outside the tank. In order to prevent leakage from the holding tank when it is removed from the RV and transported to a disposal site, it is necessary to provide a means for securely closing off the fill opening. Accordingly, a moveable valve blade is mounted within the holding tank which is normally positioned to close off the fill opening but may be actuated to uncover the opening to enable filling of the holding tank. The movable valve blade seals against the lower surface of the seal element to prevent the contents of the holding tank from leaking out and further prevents odors from being vented into the RV when the valve is closed. Additional details of the configuration of a cassette type sanitary system and its operation is presented within the above referenced patent application.

This application is particularly directed to an improved seal element for the holding tank fill opening which provides enhanced resistance to leakage of the material within the holding tank when it is being transported to a disposal site. During transporting of the holding tank, the fill opening and valve blade may be immersed in the liquid wastes in the tank and are therefore subjected to hydrostatic pressure which aggravates leakage problems. Briefly, the seal element according to this invention includes a pair of lips adapted to engage the valve blade in its closed position. One of the seal lips is inclined such that fluid pressure within the holding tank acts on the lip to cause it to more tightly seal against the valve surface, thereby providing enhanced protection against leakage.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 7 is a partial cross-sectional view taken along line 7—7 of FIG. 6 particularly showing the ramp portions formed by the valve blade guide track which urge the valve blade into sealing engagement with the fill opening seal element.

FIG. 8 is a cross-sectional view taken along line 8—8 of FIG. 6 showing the valve blade in a closed position sealing against the fill opening seal element.

DETAILED DESCRIPTION OF THE INVENTION

Figure 1:
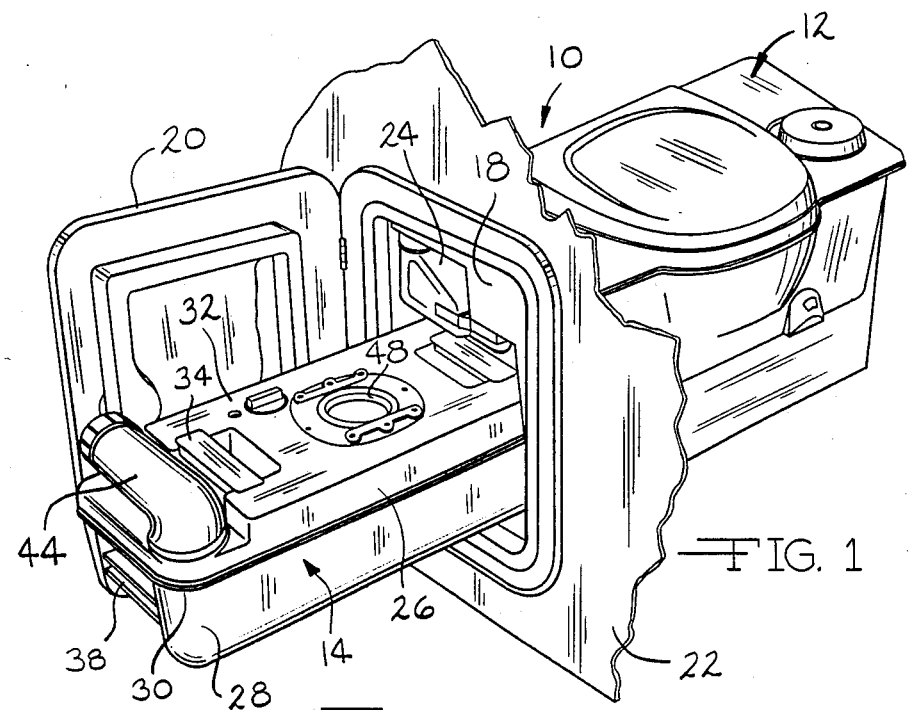
FIG. 1 is a pictorial view of a self contained RV sanitary system of the type with which this invention is particularly adapted.

FIG. 1 illustrates a self contained RV sanitary system of the type with which this invention is particularly adapted which is generally designated by reference number 10. Sanitary system 10 is described in detail in the above mentioned related application. Consequently, the specific configuration details of sanitary system 10 in its entirety will not be described herein and will be confined to the elements related to the improvements according to the present invention.

Sanitary system 10 principally includes bench structure 12 and waste holding tank 14. As shown in FIG. 1, bench structure 12 is a toilet of the type particularly adapted for use within an RV. Other configurations of bench structure 12 however, could be used such as those functioning as a sink. Bench structure 12 includes a toilet bowl having a bowl outlet opening 16 through which wastes are transported. Waste holding tank 14 fits within storage compartment 18 having access door 20 within RV wall 22. Waste holding tank 14 is adapted to be removably received within storage compartment 18. FIG. 1 illustrates access door 20 opened and waste holding tank 14 being withdrawn (or reinserted). The removeability feature of tank 14 enables it to be emptied at an appropriate disposal site in a convenient manner without risking contamination of the RV interior. Bench structure 12 further includes a fresh water system used for flushing the toilet bowl which is filled via fill container 24 which may be rotated outwardly when access door 20 is opened to enable convenient filling.

Figure 2:
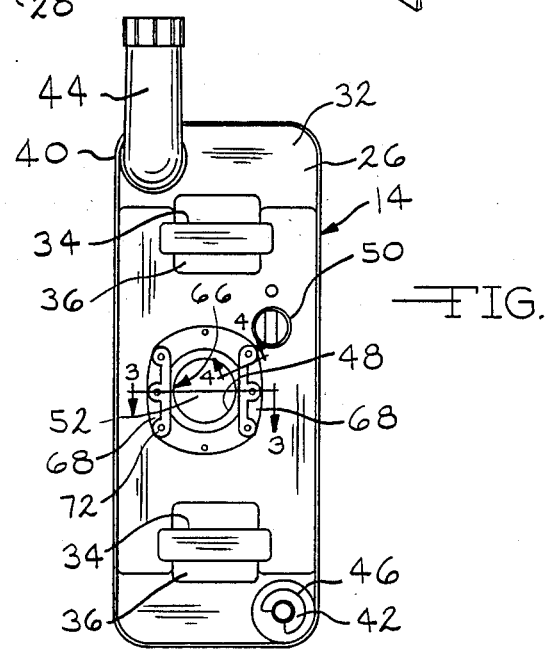
FIG. 2 is a top view of the waste holding tank component of the system illustrated in FIG. 1.

FIGS. 1 and 2 illustrate a number of the features of waste holding tank 14. Tank 14 is made of an upper portion 26 and lower portion 28, which are joined by a continuous bonded seam 30. A pair of separated handles 34 are attached to (or formed integrally with) top wall 32 which span across indentations 36. As best shown in FIG. 1, lower portion 28 also defines one or more handles 38. The handles are provided to enable convenient handling and transportation of holding tank 14. Both ends of top wall 32 define openings 40 and 42. Opening 40 is employed to support and mount drain spout 44 which can be rotated from the position shown in FIG. 1 during storage of holding tank 14, to the position shown in FIG. 2 which enables convenient dumping of the contents of the holding tank. Vent valve assembly 46 is installed within opening 42 which is manually actuated during draining to enable the contents of the holding tank to be emptied without causing a vapor lock condition. Fill opening 48 is centrally disposed within top wall 32 and is the access port through which waste products from bowl outlet opening 16 flow into holding tank 14. Actuator 50 controls movement of valve blade 52 which selectively opens or closes fill opening 48 from within holding tank 14, as will be described in greater detail below.

Figure 3:
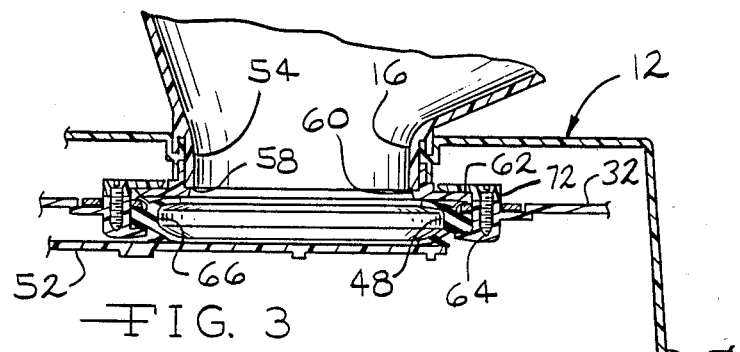
FIG. 3 is a cross-sectional view taken through the fill opening of the waste holding tank as seen from substantially line 3—3 of FIG. 2 when the tank is installed within the sanitary system in registry with a toilet bowl outlet opening and further showing the tank valve blade in a closed position.
Figure 4:
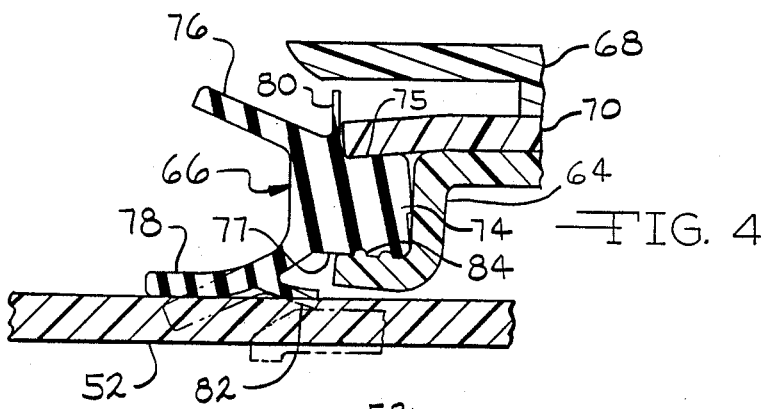
FIG. 4 is an enlarged partial cross-sectional view as seen from substantially the line 4—4 of FIG. 2 showing the interaction between the valve blade and the seal element when the holding tank is separated from the remaining components of the sanitary system.
Figure 5:
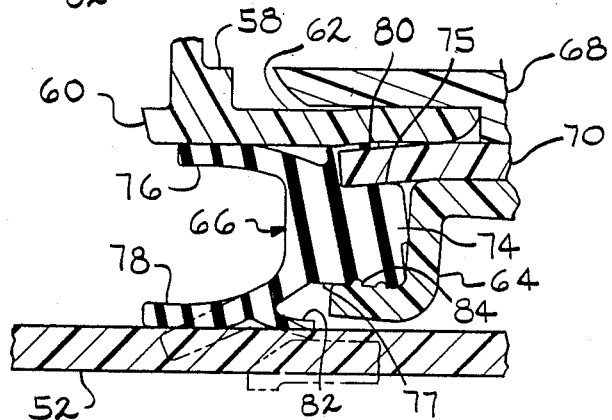
FIG. 5 is another enlarged partial cross-sectional view taken from the same location as shown in FIG. 4 showing the interaction of the elements when the holding tank is installed in registry with the toilet bowl outlet opening.

FIGS. 3 through 5 illustrate in detail the interaction between bowl outlet opening 1 and storage tank fill opening 48. Bowl outlet opening 16 defines a circular tubular portion 54 which interengages with bench 12. Flange member 58 is fastened to tubular portion 54 and bench 12. Flange member 58 defines a central circular port 60 and radially outwardly projecting flange portions 62.

Top wall 32 defines an annular groove 64 surrounding fill opening 48. Seal element 66 is disposed within groove 64 and encircles opening 48. As shown in FIG. 1, a pair of channels 68 are provided along opposing sides of fill opening 48 which are elongated in the direction of withdrawal and insertion of tank 14. Retention member 70 encircles fill opening 48. Channels 68 and retention member 70 are held in position by threaded fasteners 72.

Seal element 66 is preferably formed from an elastomer and includes main body portion 74 defining end faces 75 and 77. A pair of radially inwardly directed sealing lips 76 and 78 extend from main body portion 74 adjacent faces 75 and 77, respectively. Lip 80 extends axially from face 75 and lip 82 extends in a generally radially outward direction from lip 78. Main body portion 74 is clamped by retention member 70 and groove 64 to maintain seal element 66 in its installed position surrounding fill opening 48.

When waste holding tank 14 is inserted within storage compartment 18, fill opening 48 becomes positioned in registry with bowl outlet opening 16. When holding tank 14 is slid in position, flange portions 62 of flange member 58 slide between channels 68 and retention member 70. FIG. 4 illustrates the undeflected position of lips 76 and 80. When waste holding tank is installed, lips 76 and 80 become deflected to the position shown in FIG. 5 to seal against flange member 58. As explained in detail in the above referenced related patent application, flange portions 62 define inclined ramp surfaces which gradually move the lips of seal element 66 to the deflected position without causing binding or "rolling over" of the lips.

As mentioned previously, it is necessary to sealingly close fill opening 48 when holding tank 14 is removed from compartment 18 and transported to a disposal site. Typically, holding tank 14 will be filled with sewage wastes and accordingly the integrity of the seal between valve blade 52 and seal element 66 must be maintained. Tight sealing is particularly important if the waste holding tank 14 is filled to near capacity and is being transported in a vertical orientation such that significant hydrostatic pressure may be applied around fill opening 48. FIGS. 3 through 4 show valve blade 52 in a closed position and acting on sealing lips 78 and 82.

In accordance with the present invention, sealing lip 82, when deflected from the phantom line position, is oriented in a radially outward direction with respect to fill opening 48. This orientation of lip 82 is particularly desirable since when it is exposed to hydrostatic pressures from inside holding tank 14, it is urged to increase its contact force against valve blade 52, thus providing increasing resistance to leakage. Absent sealing lip 82, liquid wastes would act directly upon sealing lip 78, and with sufficient hydrostatic pressure, this sealing lip could be urged out of sealing contact with valve blade 52, thus resulting in leakage. Accordingly, the addition of sealing lip 82 provides a "self actuating" and redundant sealing element which improves the integrity of sealing between valve blade 52 and seal element 66. Leakage of fluids from within holding tank 14 around main body portion 74 of seal element 66 is inhibited through a pair of ribs 84 within groove 64 of which engage the seal.

Figure 6:
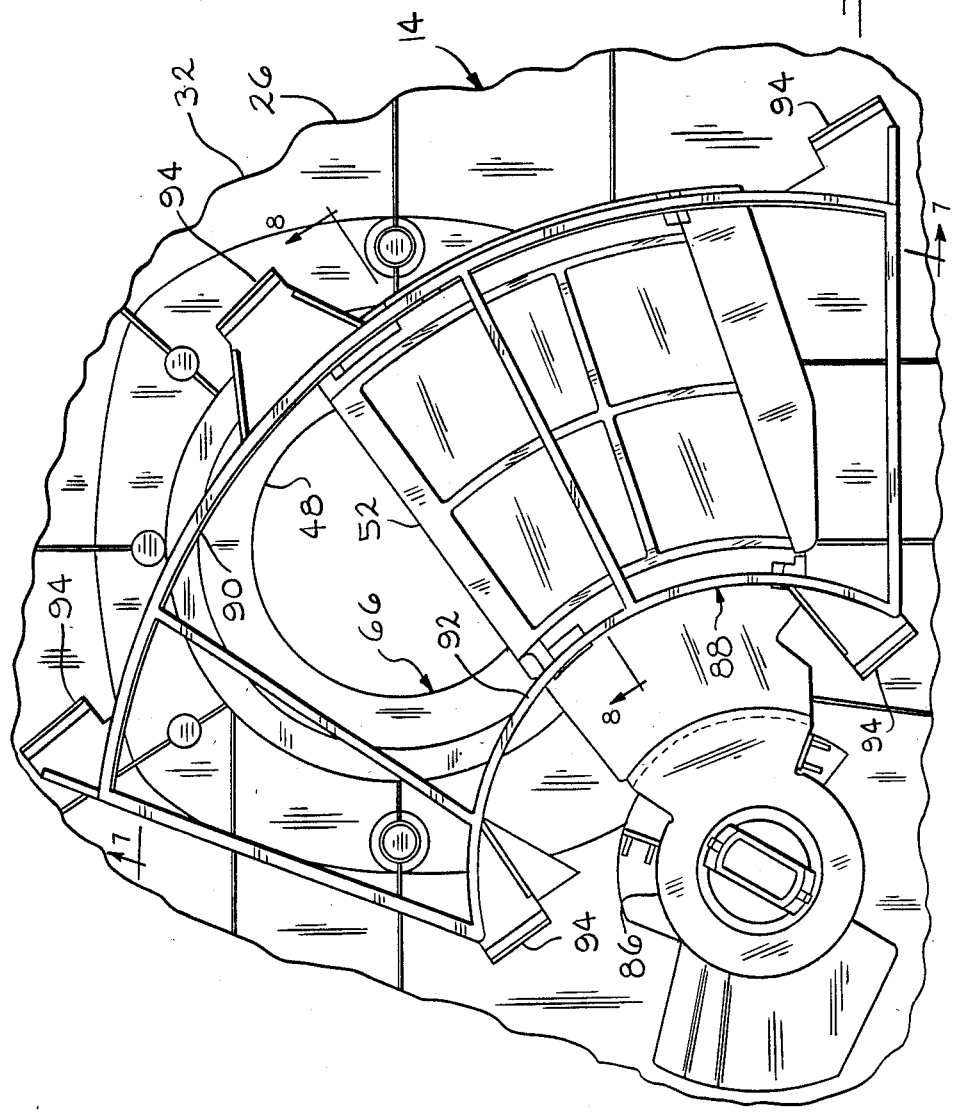
FIG. 6 is a bottom view of the inside surface of the top wall portion of the holding tank, particularly showing the fill opening and the valve blade in a partially opened position.

Valve blade 52 has a generally fan shaped configuration which is best shown in FIG. 6. Valve blade 52 is rotatable through a limited angular range about hub 86. Hub 86 is coupled to actuator 50 which is acted upon by an associated flush control mechanism when holding tank 14 is in its normal position in compartment 18. Valve blade 52 is movable between an open position wherein it is rotated in a clockwise direction from that shown in FIG. 6 which provides unrestricted flow of material through fill opening 48, to a closed counter-clockwise rotated position where the blade is in sealing engagement with seal element 66.

Track assembly 88 is affixed to the inside surface of top wall 32 and guides and retains valve blade 52. Track assembly 88 defines arcuate tracks 90 and 92 having their centers about hub 86. Track 90 has a larger radius than track 92, and guide the outer and inner peripheral edges of valve blade 52, respectively. Track assembly 88 is mechanically connected to the inside surface of top wall 32 via a plurality of attaching clamps 94 which engage corresponding posts to retain the track assembly in position. Track 90 defines ramp surfaces 96 and 98 shown in FIG. 7 which are described in detail in the above referenced related application which engage ramps 99 on the blade 52 to urge valve blade 52 to move axially against seal element 66 once the valve blade approaches its fully closed position. Track 92 also includes ramp surface (not shown) which act on the inside edge of valve 52 in a manner identical to that of ramp surface 96 and 98. The axial movement of valve blade 52 provided by the track ramp surface provides enhanced integrity of sealing with seal element 66 and further reduces friction associated with movement of the valve blade. As an additional benefit, the axial movement feature prevents buckling and folding over of lips 78 and 82.

While the above description constitutes the preferred embodiments of the present invention, it will be appreciated that the invention is susceptible to modification, variation and change without departing from the proper scope and fair meaning of the accompanying claims.

What is claimed is:

1. In a self contained sanitary system for a mobile vehicle of the type having a bench structure with a receptacle for waste with a vertically downwardly directed outlet opening and defining a storage compartment located below said outlet opening, and a holding tank removably disposed within said storage compartment, said holding tank having a fill opening positioned in registry with said outlet opening when said holding tank is inserted within said storage compartment, said holding tank having a movable valve blade adapted to be located in a substantially horizontal position below said outlet opening so as to close said fill opening and being movable from said closing position to a position to one side of said outlet opening so as to open said fill opening when it is desired to transport waste from said bench into said holding tank, said valve blade being operable in said position closing said fill opening to prevent leakage of the contents of said holding tank when said tank is removed from said storage compartment, an improved annular seal element for said holding tank fill opening comprising; an annular main body portion mounted to surround said fill opening, a first sealing lip extending generally radially inwardly of said openings from said main body portion and adapted to sealingly engage said valve blade when said valve is moved between said open and closed positions, a second sealing lip attached only at one end to and extending in a generally radially outwardly direction from said first sealing lip and adapted to sealingly engage against said valve blade when said valve blade is in said closed position, said second sealing lip being inclined with respect to said valve blade in a direction radially outward and toward said valve blade so that fluid pressure within the holding tank urges said second sealing lip against said valve blade, both said first and second lips acting to prevent the contents of said holding tank from leaking from said fill opening, said first and second sealing lips forming in cross-section a generally y-shape; wherein said sealing engagement between said valve blade and said first and second sealing lips occurs during closing of said valve blade wherein said valve blade moves axially of said openings against said sealing lips as said blade moves to its fully closed position.

2. The improved seal element according to claim 1 further comprising a third sealing lip extending in a generally radially inwardly direction from said main body for sealing against said bench structure outlet opening to prevent waste fluids from soiling the top surface of the tank.

* * * * *